(12) United States Patent
Huddleston et al.

(10) Patent No.: US 10,495,300 B2
(45) Date of Patent: Dec. 3, 2019

(54) HIGHLY EFFICIENT WOOD STOVE/HEATER

(71) Applicants: Sky Huddleston, Bourbon, MO (US); Phillip M. Huddleston, Bourbon, MO (US)

(72) Inventors: Sky Huddleston, Bourbon, MO (US); Phillip M. Huddleston, Bourbon, MO (US)

(73) Assignee: Liberator, LLC, Bourbon, MO (US)

( * ) Notice: Subject to any disclaimer, the term of this patent is extended or adjusted under 35 U.S.C. 154(b) by 182 days.

(21) Appl. No.: 15/822,073

(22) Filed: Nov. 24, 2017

(65) Prior Publication Data

US 2018/0142886 A1 May 24, 2018

Related U.S. Application Data

(60) Provisional application No. 62/426,093, filed on Nov. 23, 2016.

(51) Int. Cl.
| | |
|---|---|
| *F23B 30/00* | (2006.01) |
| *F23B 50/12* | (2006.01) |
| *F23B 80/00* | (2006.01) |
| *F23L 15/04* | (2006.01) |
| *F23G 7/10* | (2006.01) |
| *F24B 5/04* | (2006.01) |
| *F23B 50/06* | (2006.01) |

(Continued)

(52) U.S. Cl.
CPC ............ *F23B 7/005* (2013.01); *F23B 1/26* (2013.01); *F23B 50/06* (2013.01); *F23B 50/12* (2013.01); *F23B 80/00* (2013.01); *F23C 1/02* (2013.01); *F23C 1/04* (2013.01); *F23G 7/105* (2013.01); *F23L 15/04* (2013.01); *F24B 5/04* (2013.01); *F23B 2900/00001* (2013.01); *F23G 2206/00* (2013.01); *F23G 2900/50002* (2013.01); *F23J 2219/10* (2013.01)

(58) Field of Classification Search
CPC .......... F23B 7/005; F23B 50/06; F23B 50/12; F23B 80/00; F23B 1/26; F23B 2900/00001; F23L 15/04; F23C 1/04; F23C 1/02; F23J 2219/10
See application file for complete search history.

(56) References Cited

U.S. PATENT DOCUMENTS

| | | | | |
|---|---|---|---|---|
| 4,194,487 A | * | 3/1980 | Cadwallader | F24B 1/16 126/61 |
| 4,397,293 A | * | 8/1983 | Pibernat | F24B 1/1886 126/532 |

(Continued)

*Primary Examiner* — David J Laux
(74) *Attorney, Agent, or Firm* — Michael L. Greenberg, Esq.; Greenberg & Lieberman, LLC

(57) ABSTRACT

A highly efficient indoor heating system and device is described. The device is equipped with an internal chimney, as well as vents that are configured to maximize the draft applied to the flame housed within a stove combustion area. The heater is configured to reach temperatures exceeding 300 degrees Fahrenheit in approximately ten minutes. A gravity fed fuel tube, potentially in communication with a wood pellet hopper, is configured to deliver fuel to the stove of the heater. Heat is distributed throughout the structure of the device, and a convection chamber within the device ensures that heat generated is not quickly lost via exhaust.

11 Claims, 8 Drawing Sheets

(51) Int. Cl.
*F23C 1/02* (2006.01)
*F23C 1/04* (2006.01)

(56) References Cited

U.S. PATENT DOCUMENTS

| | | | | |
|---|---|---|---|---|
| 5,014,680 A | * | 5/1991 | Siemer | F23B 7/005 110/214 |
| 9,273,869 B1 | * | 3/2016 | O'Reilly | F24B 5/04 |

* cited by examiner

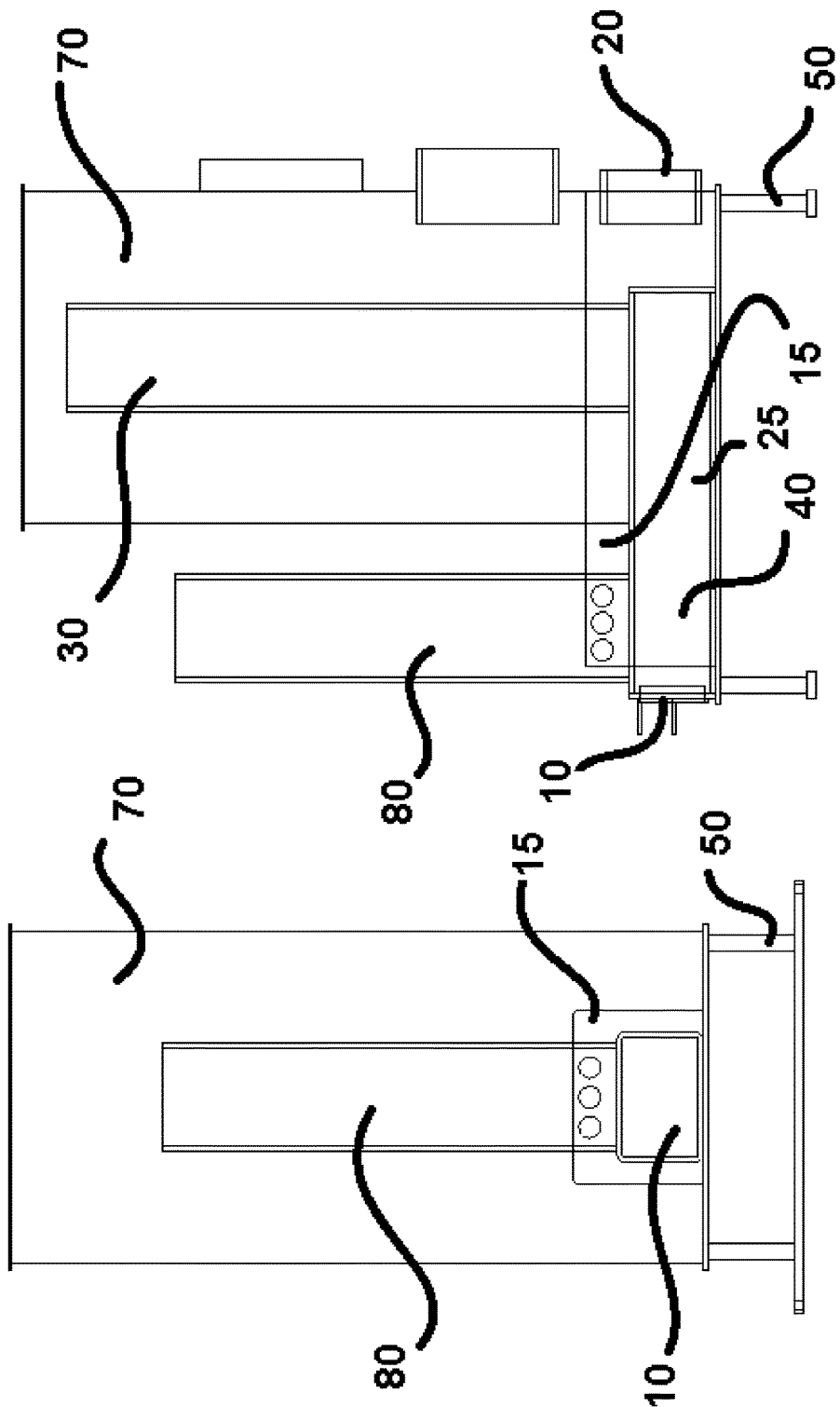

HIGHLY EFFICIENT WOOD STOVE/HEATER

This application is a non-provisional application of provisional patent application No. 62/426,093, filed on Nov. 23, 2016, and priority is claimed thereto.

FIELD OF THE PRESENT INVENTION

The present invention is related to non-electric heating devices, and more specifically relates to a highly efficient "rocket heater" configured to employ a gravity-fed fuel system equipped with an internal chimney, durable proprietary components including a downdraft burn grate employing a down-draft combustion principle, and an off-set heat riser for optimal thermal conduction of heat into the structure.

BACKGROUND OF THE PRESENT INVENTION

Conventionally, homes, businesses, and other structures that exist outside of the tropics are equipped with at least one heater. Often, the heater is electric, and may be built into the HVAC system of the structure. Other structures employ a fireplace, which requires someone to tend to a fire consistently in order to ensure constant and consistent heat. While both methods provide heat to the structure and its occupants, neither are very efficient. Electric heaters, especially those powered via an HVAC unit can be expensive to operate, and much of the heat is lost through ducting and poor insulation.

Most conventional wood stoves either use a catalytic combustor, or they limit the air supply so as to reignite the gases later. Conventional systems such as these are often difficult to maintain, are overly complex, and are very expensive. Additionally, many do not employ a down-draft burn principle.

In response, the "Rocket Stove" was conceived of in 1982 by Dr. Larry Winiarsky for the Aprovecho Research Center. Ianto Evans of the Cobb Cottage Co. then proceeded to apply Dr. Winiarsky principles on cook stoves and household heating using Cobb as a thermal mass, in effect creating a unique masonry heater. Ernie and Erica Wisner then picked up on this technology, and further developed it into a full fledged masonry heater.

While masonry heaters are efficient, they are not practical for use in conventional homes and business. Masonry heaters, as well as any heater with thermal mass, are not UL listed, and must be built on-site. Therefore, in order for a structure to be eligible for such a masonry heater, a professional is required for installation. Additionally, the structure's foundation must be rated to support over 1200 pounds of weight. Most building codes do not allow this, and it is often difficult to insure. As such, these masonry heaters are not viable options for most customers.

Heaters that employ principles similar to that of masonry heaters are known to be expensive, and are often unsafe for use in conventional structures. Due to this expense, it is presently uncommon for similar heaters to be installed in conventional structures such as residences.

In order to attain wood for such heaters, chainsaws are often employed. Chainsaws, which are conventionally gasoline powered, which partially defeats some of the benefits of heating with wood), are the number one tool involved in on-the-job accidents in North America. Conventional axes are not much safer than chainsaws. Therefore, reducing the time spent behind these tools helps to reduce the chance of injury, such as the loss of a finger.

Thus, there is a need for a cost effective and environmentally friendly alternative to conventional heating sources, which may rival gas and electric as the sustainable and economical heating source of the next century. Additionally, there is a need for a heater that can be more efficient and longer lasting with less wood fuel to burn, which brings added benefits to the environment, while simultaneously reducing the probability of injury behind a chainsaw or axe.

SUMMARY OF THE PRESENT INVENTION

The present invention is a highly efficient, gravity-fed burning heater configured for use within the home or business. The heater is equipped with an internal chimney, at least one exhaust, a front access door, a combustion area, a convection chamber, a gravity fed chute in communication with a fuel pellet hopper, and support struts.

Heaters such as the present invention are ideal for individuals and families that ascribe to self sufficient living, homesteaders, and the off grid living forums and their respective community's and sub cultures. The present invention is configured to use $1/4^{th}$ of the wood a typical wood stove uses to generate heat, and it does so by burning tree limbs and large sticks, while being one of the cleanest burning wood stoves made. The high efficiency of the present invention is accomplished by maximizing draft and therefore, the oxygen supply to the flame, effectively using similar principles that large scale metallurgical blast forges employ to create steel and other industrial products.

Additionally, the design of the present invention is configured to maximize the thermodynamics of heat transfer, which heaters of the prior art ignore. Therefore, the present invention makes use of convection, conduction, as well as radiation to effectively transfer heat into a room. As such, the present invention is configured to maximize the volume of the stove, which slows the gases soon to be exhausted, and maximizes the surface area of the stove that the exhaust gases contact during use.

Additionally, the geometric concept employed in the design of the present invention is crucial to the maximization of the draft applied to the flame. The present invention is equipped with an internal chimney, which facilitates the strong draft creating a 'forge' effect. The internal chimney of the present invention only permits gases that are substantially cooler than those disposed at the top of the convection chamber to fall to the bottom of the wood stove of the present invention and vent into the chimney, which is attached to the bottom of the stove.

The present invention is configured to reach temperatures as high as 300 degrees Fahrenheit in less than ten minutes. The present invention reaches its optimal 'idle' temperature of 650 degrees Fahrenheit in approximately 30 minutes. If the user opts to used seasoned hardwood as a fuel for the heater, the present invention can reach temperatures as high as 750 degrees Fahrenheit on the top plate safely. These high temperatures are maintained throughout the structure of the heater, however the stove pipe remains well under 300 degrees on average. The present invention accomplishes these temperatures with nothing more than sticks, branches, and split staves that are less than two inches in diameter. Additionally, waste wood products, such as 2×4 boards, blocks, scraps, and other waste products which are often overlooked for use in conventional heaters function as ideal fuels for the heater of the present invention.

The present invention can be used for heat for over one hour and fifteen minutes without the need to refuel if hardwood is used. Similarly, the heater can be used for approximately 45 minutes with the use of branches and softwood as fuel. Ideally, fuel can be provided from $1/4^{th}$ of an 18 inch long log, split into staves, which provides the most extreme amount of heat for more than two hours. Additionally, the heater can be started in approximately 30 seconds, and requires little training for use.

BRIEF DESCRIPTION OF THE DRAWINGS

The present invention will be better understood with reference to the appended drawing sheets, wherein:

FIG. 8 shows a front view of an alternate embodiment of the present invention, depicting the intake air preheating shroud of the present invention.

FIG. 9 displays a side view of an alternate embodiment of the present invention, depicting the intake air preheating shroud of the present invention.

DETAILED DESCRIPTION OF THE PREFERRED EMBODIMENT

Figure 1:
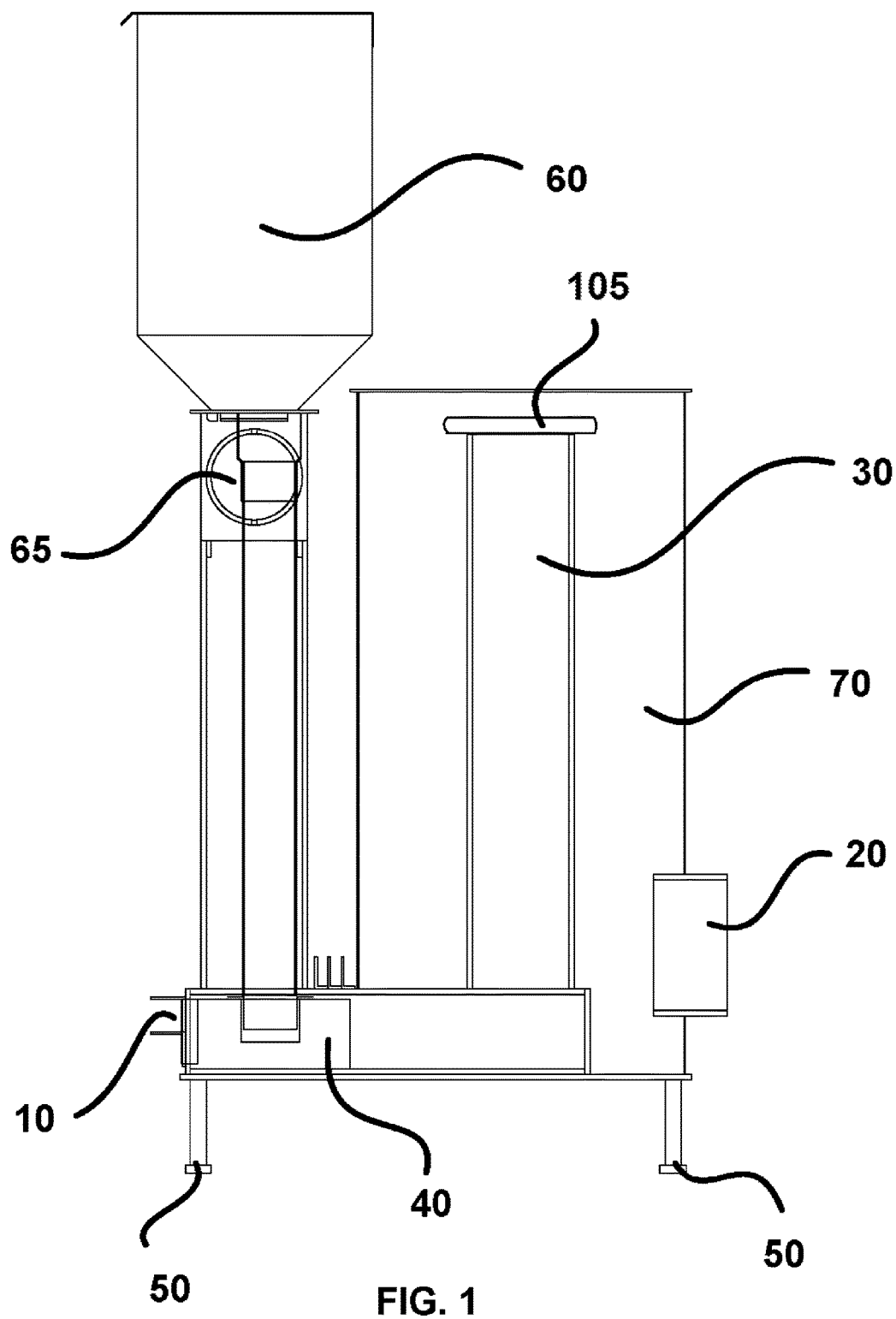
FIG. 1 exhibits a view of the present invention as seen from the side.
Figure 2:
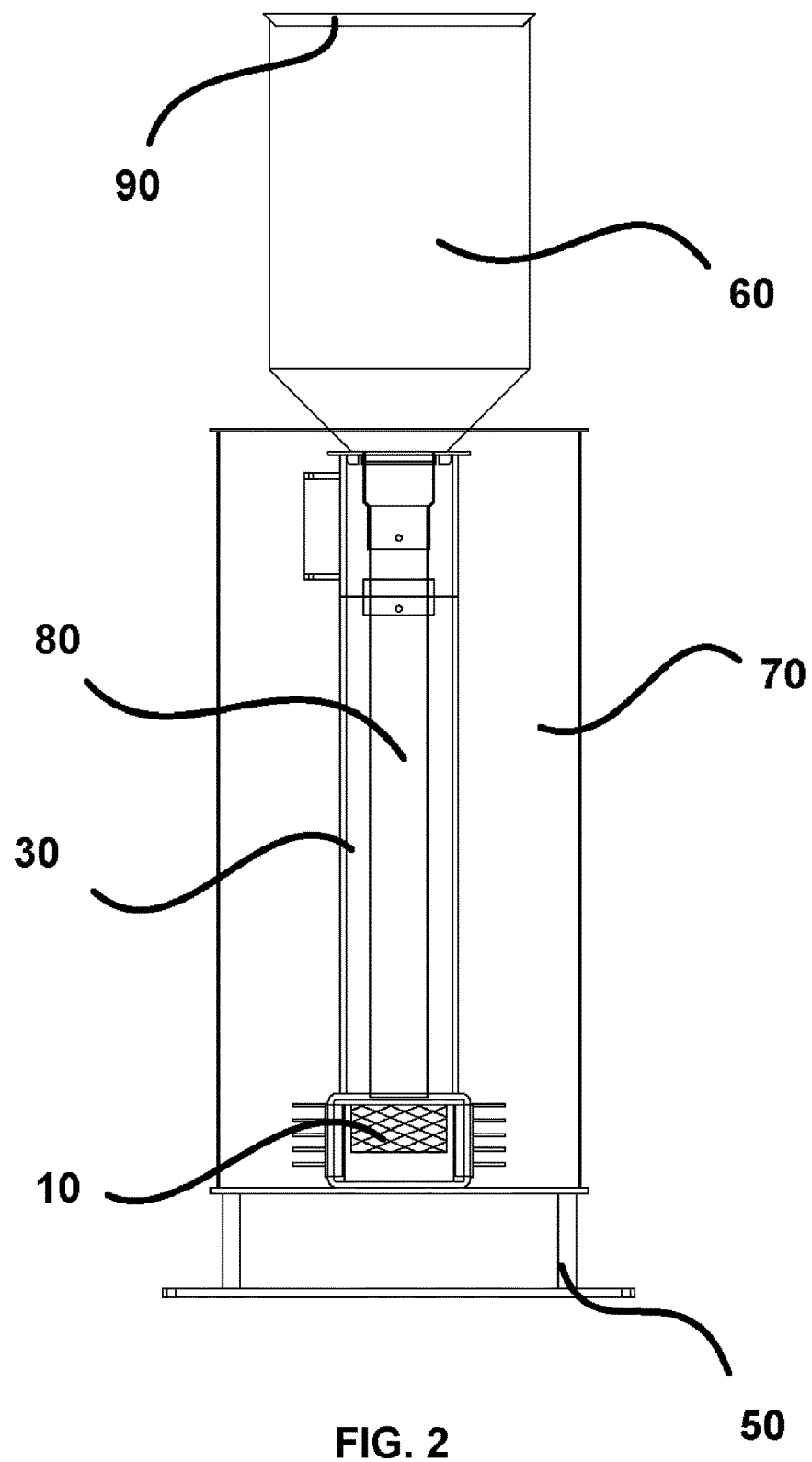
FIG. 2 depicts a view of the present invention as seen from the front.
Figure 3:
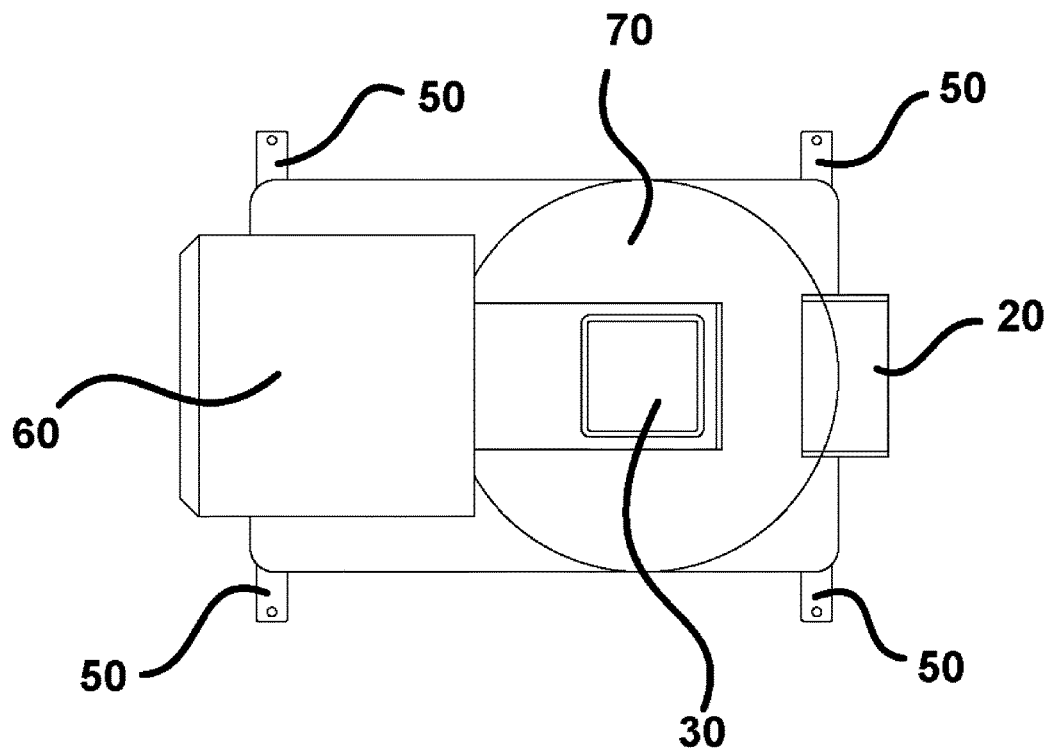
FIG. 3 displays a view of the present invention as seen from the top.
Figure 4:
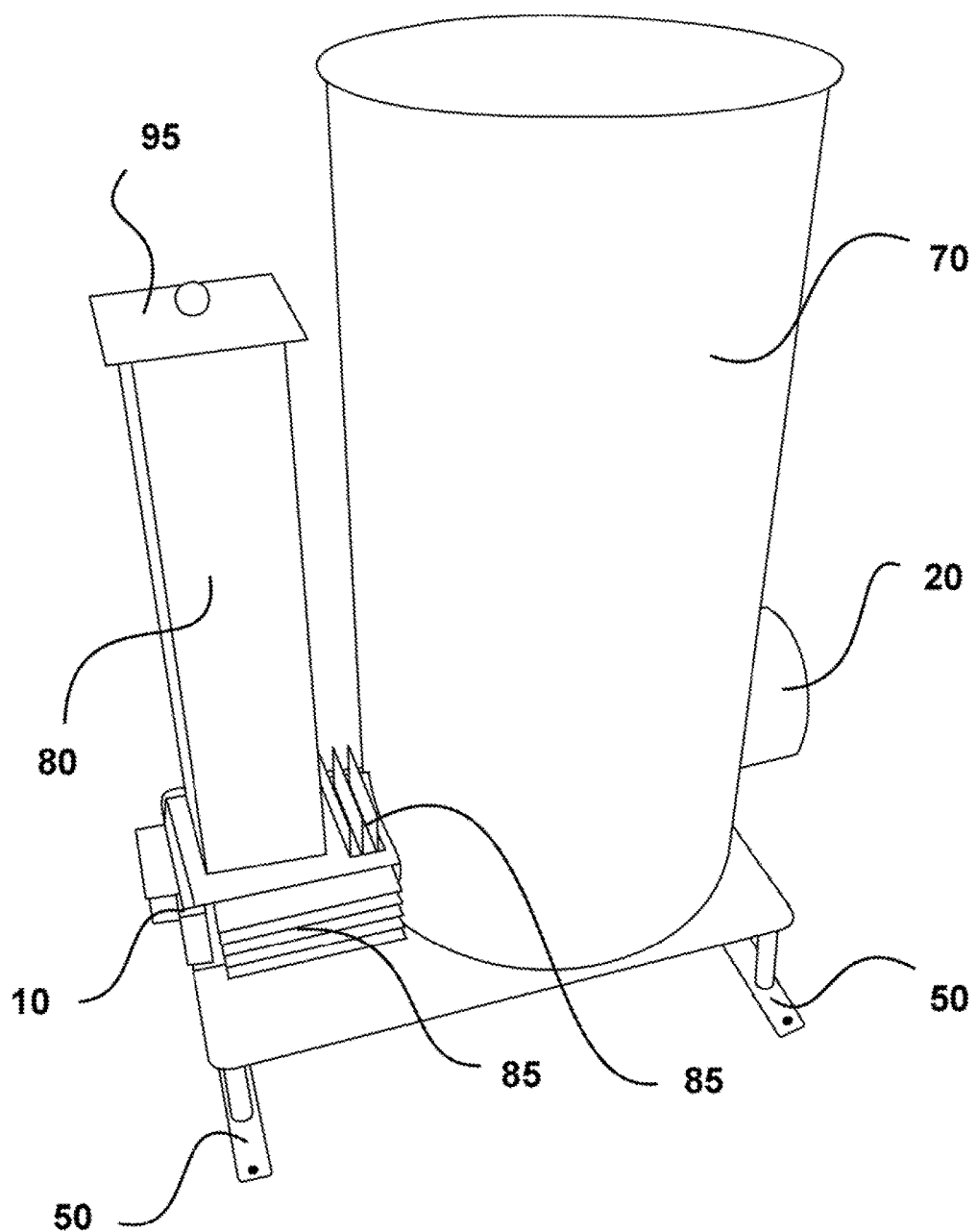
FIG. 4 shows a view of the present invention from the side, without the pellet hopper.
Figure 5:
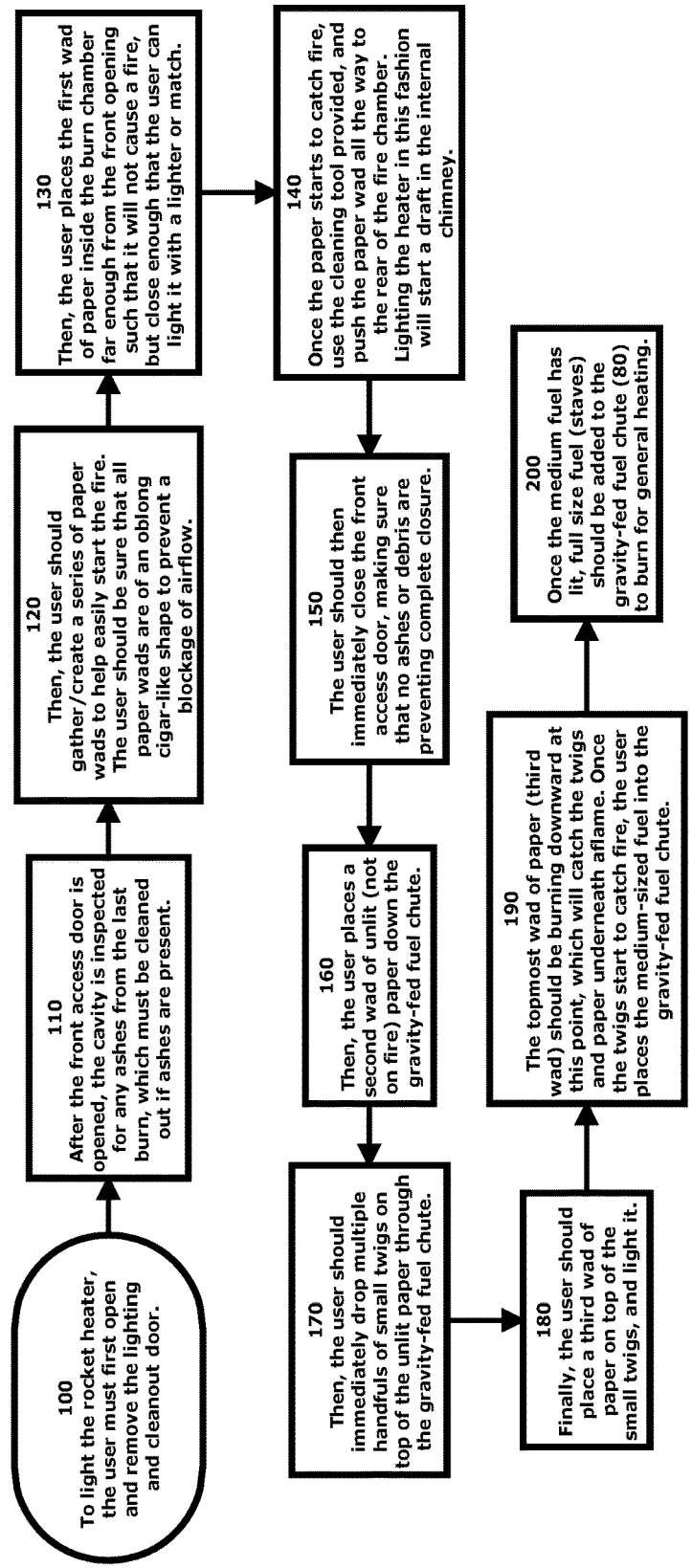
FIG. 5 displays a flow chart depicting the basic lighting and use procedure of the present invention.
Figure 6:
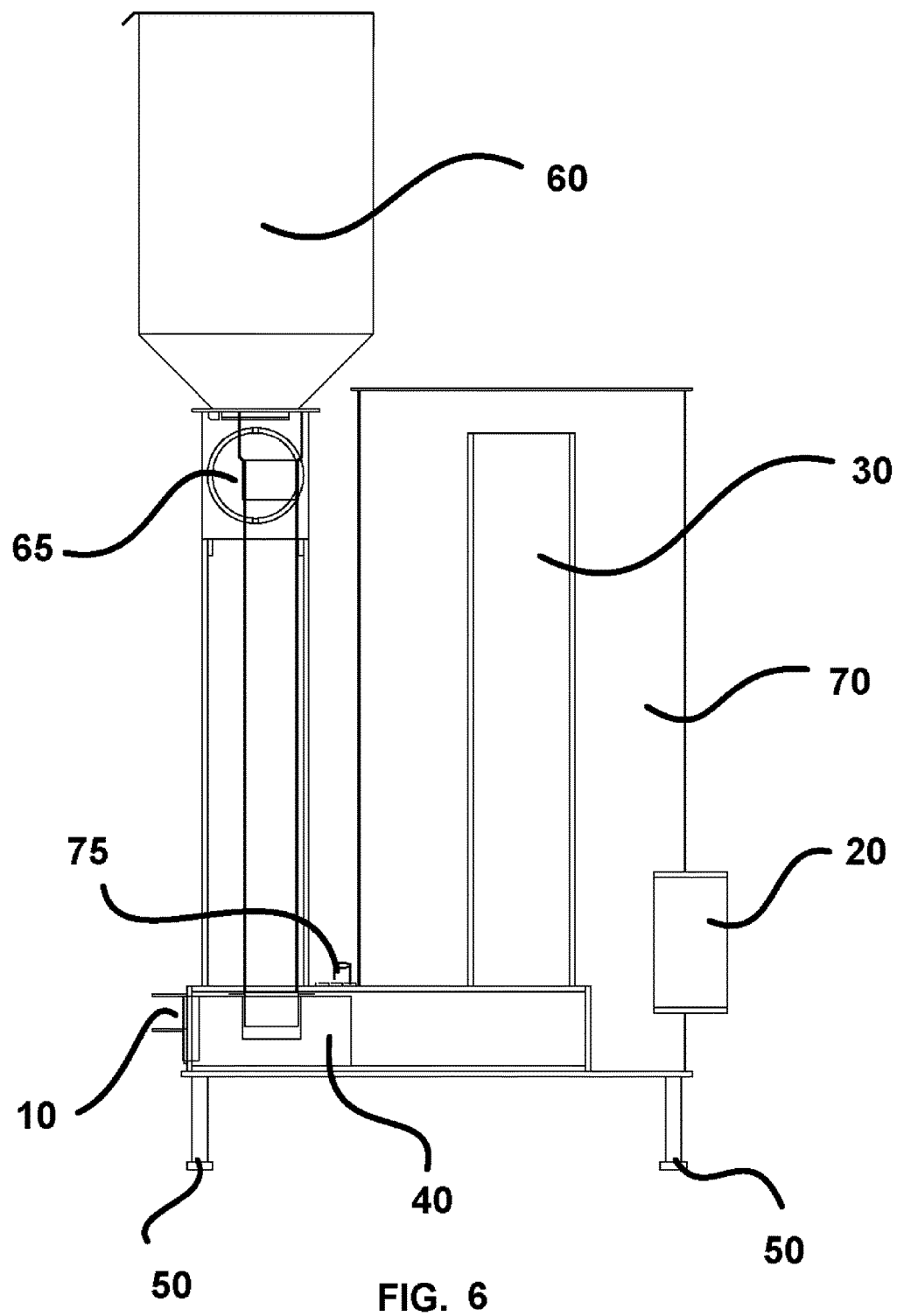
FIG. 6 exhibits a view of the present invention as seen from the side, showing the fuel couplings.
Figure 7:
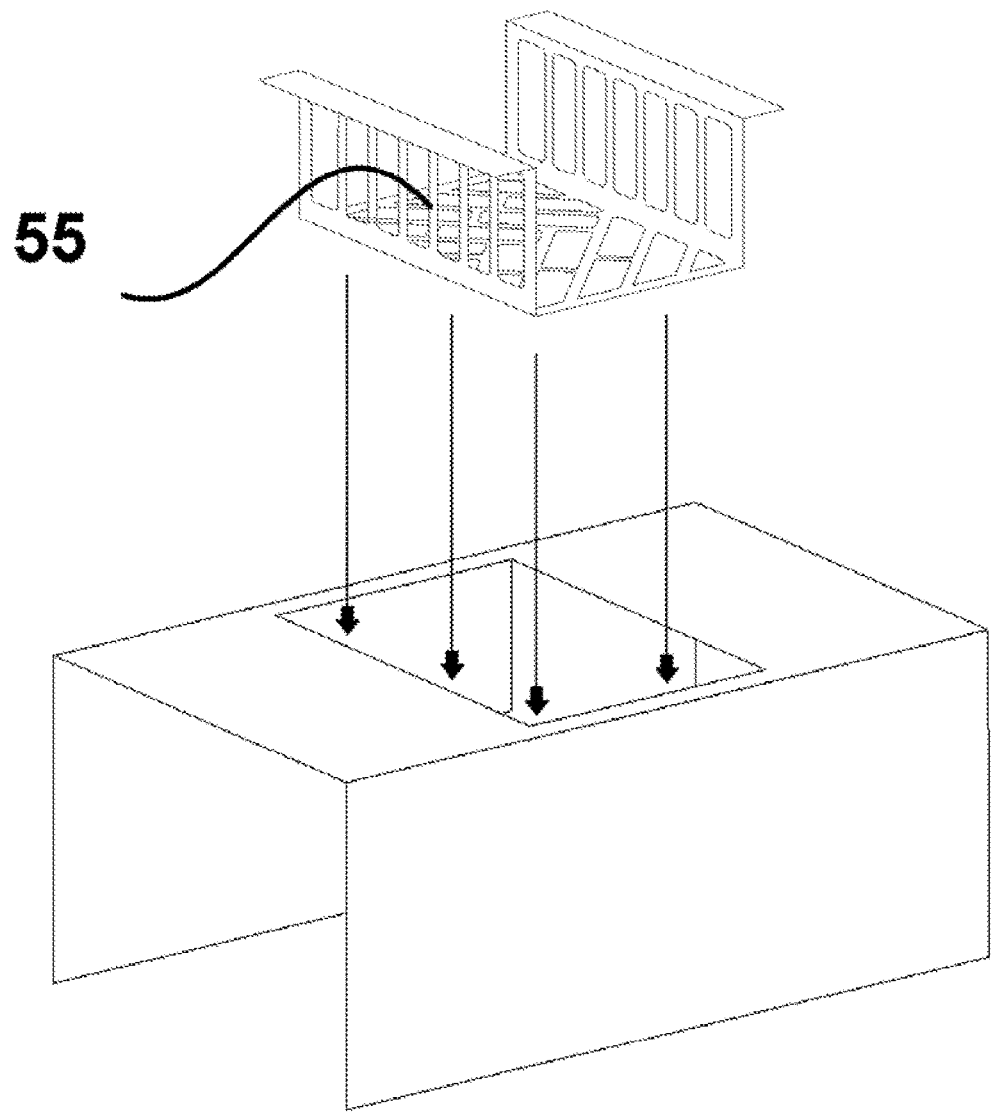
FIG. 7 depicts a front and side view of the burn grate of the present invention.

The present invention is a highly efficient indoor heater system configured for safe use within a home, business, or other structure equipped with a chimney. The present invention is equipped with a front access door (10), at least one exhaust (20), and internal chimney (30), a stove combustion area (40) (known to be a combustion chamber), a convection chamber (70), a gravity-fed fuel chute (80), and support struts (50). Most of the construction of the present invention is fashioned of metallic alloys capable of withstanding heat of over 1000 degrees Fahrenheit. Some embodiments of the present invention are preferably equipped with a pellet hopper (60), which is configured to feed fuel pellets into the gravity-fed fuel chute (80) to supply fuel to the fire. The pellet hopper (60) is preferably equipped with a pellet hopper lid (90), which ensures that the system remains closed, and that cool outside air does not enter the structure. When the pellet hopper (60) is not used, a chute lid (95) is employed to cap the top of the gravity-fed fuel chute (80), as shown in FIG. 4. Additionally, heat sinks (85) are preferably present in multiple locations on the present invention, to help with the dissipation of heat from the heater, and into the structure. The support struts (50) are preferably bolted to the floor during installation of the present invention to its preferred position.

Additionally, the present invention is unique in that it provides the following features:

A drop in and removable pellet hopper (60) for the heater.

A Downdraft burn grate (55) is configured to hold solid fuel in the heater, and is optionally removable when heater is used with staves.

Fluid, liquid, and gaseous fuel couplings (75) used in conjunction with the heater. These fuel couplings (75) enable the user to use combustible liquid or gases within the combustion chamber, such as kerosene and propane.

Square, hexagonal, pentagonal, rectangular, and polygonal shapes for the heat exchanger of a heater. The square shape is the most efficient version of the heat exchanger, however other shapes are available to suit the aesthetic choice of the owner.

Off-set heat riser for better thermal conduction of heat into the room

A catalytic combustor 105 used on top of the internal chimney (30) of the heater is preferably present to disseminate any ongoing gases, and promotes oxidation.

A down-draft combustion principle for the heater is employed to maximize efficiency, ensuring the flame burns down through the present invention.

Double walled metal and insulation lining the combustion chamber and riser tube of the heater.

Heat sinks (85) or cooling fins welded to the heater in most embodiments of the present invention.

Heightened gravity-fed fuel chute (80)

An outside air intake (65) for the heater—both removable and non-removable options are available to cater to the preference and budget of the user. As such, the air intake (65) can be placed to the left or right of the heater, unlike a fixed air intake that can not be removed. If configured, the air intake (65) may be connected to a pipe that extends out of the home or structure, such that outdoor air is used in the intake. A conventional dryer vent (without flap) is preferably present in such a configuration.

An adjustable damper on the outside air intake (65) serves to reduce air volume within the heater, and slows the burn to the preference of the user. As such, the present invention may also be configured with a traditional air intake flue.

In some embodiments, an airtight intake air preheating shroud (15) is preferably disposed around the stove combustion area (40) (combustion chamber) where combustion air is preheated by a horizontal burn tube (25) for better efficiency, as depicted in FIG. 8 and FIG. 9. The intake air preheating shroud (15) is designed to maximize the heating efficiency of the present invention, facilitating a better burn. The intake air preheating shroud (15) exhibits a shroud cavity disposed between the stove combustion area (40) and the horizontal burn tube (25), in which air is preheated. The air entering through the outside air intake (65) is drawn towards the stove combustion area (40), and is preheated by air within the stove combustion area (40) as well as within the horizontal burn tube (25), maximizing efficiency. The air within the stove combustion area (40) and horizontal burn tube (25) is traveling in the opposite direction of the air from the outside air intake (65), towards the convection chamber (30).

Instructions for use of the present invention preferably include:

To light the rocket heater, the user must first open and remove the lighting and cleanout door (front access door). (100) After the front access door (10) is opened, the cavity is inspected for any ashes from the last burn, which must be cleaned out if ashes are present. (110) Then, the user should gather/create a series of paper wads to help easily start the fire. The user should be sure that all paper wads are of an oblong cigar-like shape to prevent a blockage of airflow. (120) Then, the user places the first wad of paper inside the burn chamber far enough from the front opening such that it will not cause a fire, but close enough that the user can light it with a lighter or match (or other incendiary device). (130) Once the paper starts to catch fire, use the cleaning tool provided, and push the paper wad all the way to the rear of the combustion chamber. Lighting the heater in this fashion will start a draft in the internal chimney (30). (140) The user should then immediately close the front access door (10), making sure that no ashes or debris are preventing complete closure. (150) Then, the user places a second wad of unlit (not on fire) paper down the gravity-fed fuel chute (80). (160) Then, the user should immediately drop multiple handfuls of small twigs on top of the unlit paper through the gravity-fed fuel chute (80). (170) Finally, the user should place a third wad of paper on top of the small twigs, and light it. (180) The topmost wad of paper (third wad) should be burning downward at this point, which will catch the twigs and paper underneath aflame. Once the twigs start to catch fire, the user places the medium-sized fuel into the gravity-fed fuel chute (80). (190) Once the medium fuel has lit, full size fuel (staves) should be added to the gravity-fed fuel chute (80) to burn for general heating. (200)

The user should be sure to check on the state of the fire approximately once every hour, and place more wood into the pellet hopper (60) as necessary to maintain the fire, or staves into the gravity-fed fuel chute (80). When the user has finished using the present invention, the user places the lid on the top of the gravity-fed fuel chute (80). This will prevent cold air from coming in and/or hot air from leaving the house, this step greatly reduces the burning/fuel necessary to maintain the comfortable temperature in the building.

It should be noted that the user should not try to manually regulate the draft, as the present invention is configured to employ a high draft in order to function properly. The present invention runs safe, clean, and efficient because of the high draft it creates. It is designed to operate with extreme draft. Attempting manual draft regulation is unsafe, will result in excessive creosote buildup, and may create a dangerous situation. The amount of heat this appliance generates is proportionate to the amount of fuel placed in the heater. If the user requires less heat, the user simply uses less fuel, and the heat provided is throttled.

The user should never load fuel from the front access door (10), which is preferably configured to slide up and down easily for access to the flame within the stove combustion area (40). It is envisioned that the access door (10) is only for lighting/startup and cleaning the present invention. The user should only load fuel from the top of the vertical tube and should not put the top lid on top of the vertical fuel tube while the stove is in operation, unless he/or she has an outside air intake adapter (sold separately) properly installed, which in that case the user should always have the top lid over the fuel tube.

The user should remember to place the top lid on the gravity-fed fuel chute (80) when not in use, as this will prevent drafting of hot air out, or letting cold air in to the house. In the event of a chimney fire, the user is advised to contact the fire department immediately. If the stove is not currently using an outside air intake, the user is advised to place the top lid on the vertical feed tube in order to restrict as much air as possible which may reduce the intensity of a chimney fire. If the user opts to use an outside air intake keep a five gallon bucket of sand handy to pour into the fuel chamber (this is a good idea even if the user is not using an outside air intake for the sake of redundancy, i.e. the top lid will not shut). This alternative will also limit available oxygen to the chimney fire. The user is advised to always have a fire extinguisher close by and at the ready in the event of any emergency.

It should be noted that the present invention is preferably installed by a licensed technician to ensure optimal and safe performance. The process of installation and use of the present invention is preferably as follows:

1. The user acquires the present invention via purchase from a retailer or online e-retailer.
2. The user opens the packaging of the present invention and removes the components of the present invention, and ensures all pieces are present.
3. If not previously installed in the structure, the user should first install a stovepipe and/or chimney to the structure. Only a cleaned and inspected masonry chimney that is properly lined for wood burning appliances, or a UL listed chimney should be installed.
4. The rear of the heater (via the at least one exhaust (20)) is then connected to the flue pipe and chimney of the structure, and all joints are mechanically locked by using at least three sheet metal screws at each joint. The flue and chimney should be installed with the crimped end of the joints and elbows oriented downwards, toward the exhaust of the heater. This ensures that, in the event of excessive creosote buildup, the creosote will not run or flow to the outside of the chimney or flue, causing an external fire hazard.

For connection of the present invention to a Masonry Chimney, the user should adhere to the instructions below:

1. Use a minimum of 3½" inch brick masonry wall framed to a combustible wall. A fireclay liner (ASTM 135 or equivalent) having a ⅝" inch minimum wall thickness must be used and it must be at least 12" inches (1' foot) away from any material that could catch fire. The inside diameter of the fire clay liner shall be sized for the proper snug fit to a 6" inch diameter chimney connector pipe. The fireclay liner shall run to, but not beyond, the inner surface of the chimney flue and be firmly cemented in place.
2. Use a solid insulated listed factory built chimney length having an inside diameter of 6" inches and having 1" inch or more of solid insulation. There must be at least a 9" inch air space between the outer wall of the chimney length and any combustible materials. The inner end of the chimney length shall be flush with the inside of the masonry chimney flue which shall be sealed to the flue and to the brick masonry penetration with non-water-soluble refractory cement. Flash sheet steel supports, which are at least 24 gauge (0.024" inches) in thickness, are preferably securely fastened to wall surfaces on all sides. Fasteners between supports and the chimney length shall not penetrate the chimney liner.
3. Use a 10" inch diameter ventilated thimble made of at least 24 gauge (0.024" inch) steel having two (2) 1" inch air channels. The ventilated thimble must be separated from combustible materials by at least 6" inches of glass fiber insulation. The opening in the combustible wall shall be covered and the thimble supported with sheet steel supports which are at least 24 gauge (0.024" inch) in thickness. The sheet steel supports shall be securely fastened to wall surfaces on all sides and shall be sized to fit and hold the chimney section. Fasteners used to secure chimney sections shall not penetrate the chimney flue liner.
4. Use an 8" inch diameter solid insulated listed factory-built chimney length which has 1" inch or more solid insulation. The minimum length of the chimney section shall be 12" inches and will serve a pass through for the 6" inch diameter chimney connector. There must be at least a 12" inch air space between the outer wall and the chimney section and any combustible materials. The chimney section shall be concentric with and spaced 1" inch away from the chimney connector by means of sheet steel support plates on both ends of the chimney section. The opening in the combustible wall shall be covered and the chimney section supported on both sides with sheet metal supports which are at least 24 gauge (0.024" inches) in thickness. The sheet steel supports shall be securely fastened to wall surfaces on all sides and shall be sized to fit and hold the chimney section. Features used to secure chimney sections shall not penetrate the chimney flue liner.

5. A listed factory-built wall pass-through system may be purchased and installed according to the instruction supplied with it to provide a safe method of passing the chimney connector through a combustible wall for connection to a masonry chimney.

It should be noted that when the heater is used on a combustible floor, the user should employ an Underwriters Laboratory Listed or equivalent Type 2 floor protector to ensure safe operation. The floor protector must comply with NRTL Standards. Ideally, the floor protector should extend at least 16 inches beyond the front of the cleanout door of the heater, eight inches beyond each side of the door, and at least six inches past the back of the chimney pipe. Additionally, the floor protector should extend under, and two inches beyond, each side of the chimney connector. There must be at least 36 inches from the top of the heater to the ceiling.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A heater apparatus comprising:
an outside air intake;
a heightened gravity-fed fuel chute;
a combustion chamber;
heat sinks, said heat sinks disposed on an outside of said convection chamber;
an exhaust;
a convection chamber, said convection chamber disposed in communication with said exhaust;
double-walled insulation, said double-walled insulation lining said combustion chamber;
an internal chimney;
a catalytic combustor, said catalytic combustor disposed atop said internal chimney;
wherein said internal chimney is off-set from a center of said combustion chamber to maximize thermal conduction of heat;
fuel couplings:
a heat exchanger;
a pellet hopper, said pellet hopper disposed atop said combustion chamber;
wherein said pellet hopper is removable;
a downdraft burn grate, said downdraft burn grate configured to hold solid fuel within the heater; and
support struts, said support struts are disposed beneath the heater.

2. The apparatus of claim 1, wherein said heat sinks are cooling fins.

3. The apparatus of claim 1, further comprising:
a pellet hopper lid, said pellet hopper lid disposed atop said pellet hopper;
wherein said pellet hopper is configured to contain wood pellets; and
wherein said gravity-fed fuel chute channels said wood pellets to a fire within said combustion chamber.

4. The apparatus of claim 1, wherein said combustion chamber employs a down-draft combustion principle.

5. The apparatus of claim 1, wherein said fuel couplings include at least one of the following: a gaseous fuel coupling, a fluid fuel coupling, a liquid fuel coupling.

6. The apparatus of claim 1, wherein the heat exchanger is square.

7. The apparatus of claim 1, wherein the heat exchanger is rectangular.

8. The apparatus of claim 1, wherein the heat exchanger is polygonal.

9. The apparatus of claim 1, further comprising:
a door, said door configured to provide access to said downdraft burn grate; and
wherein said downdraft burn grate is disposed within said combustion chamber.

10. The apparatus of claim 1, further comprising:
an intake air preheating shroud, said intake air preheating shroud disposed around said combustion chamber;
a horizontal burn tube, said horizontal burn tube disposed in communication with said combustion chamber and said down draft burn grate; and
a shroud cavity, said shroud cavity disposed between said combustion chamber and said horizontal burn tube.

11. A method of using the apparatus of claim 1 comprising:
placing combustible kindling into a stove combustion area of the down-draft convection heater via a front access door;
igniting the combustible kindling with an incendiary device, creating a draft within an internal chimney;
placing combustible kindling down into a gravity-fed fuel chute;
the combustible kindling catching fire;
placing fuel down into the gravity-fed fuel chute;
the fuel resting on a downdraft burn grate;
placing a lid atop the gravity-fed fuel chute, ensuring cool air from entering the structure;
a high draft forming within the stove combustion area, the high draft entering through an outside air intake;
warm air traveling from the stove combustion area, through a horizontal burn tube, to a convection chamber;
the warm air heating the convection chamber,
the convection chamber radiating heat into the structure;

wherein said down draft burn grate channels the high draft to the stove combustion area;

the high draft from the outside air intake passing around the horizontal burn tube within a shroud cavity created between the horizontal burn tube and an intake air preheating shroud;

the horizontal burn tube preheating the high draft air from the outside air intake within the shroud cavity; and the high draft reaching the fuel, causing the fuel to burn hotter.

\* \* \* \* \*